Feb. 21, 1928.

E. C. CALKINS 1,659,806

STEAM COOKER

Filed July 1, 1925  3 Sheets-Sheet 1

INVENTOR
Edward C. Calkins
BY
Harold C. Thorne
ATTORNEY

Feb. 21, 1928.

E. C. CALKINS 1,659,806

STEAM COOKER

Filed July 1, 1925

INVENTOR
Edward C. Calkins
BY
ATTORNEY

Feb. 21, 1928.                                                1,659,806
E. C. CALKINS
STEAM COOKER
Filed July 1, 1925            3 Sheets-Sheet 3
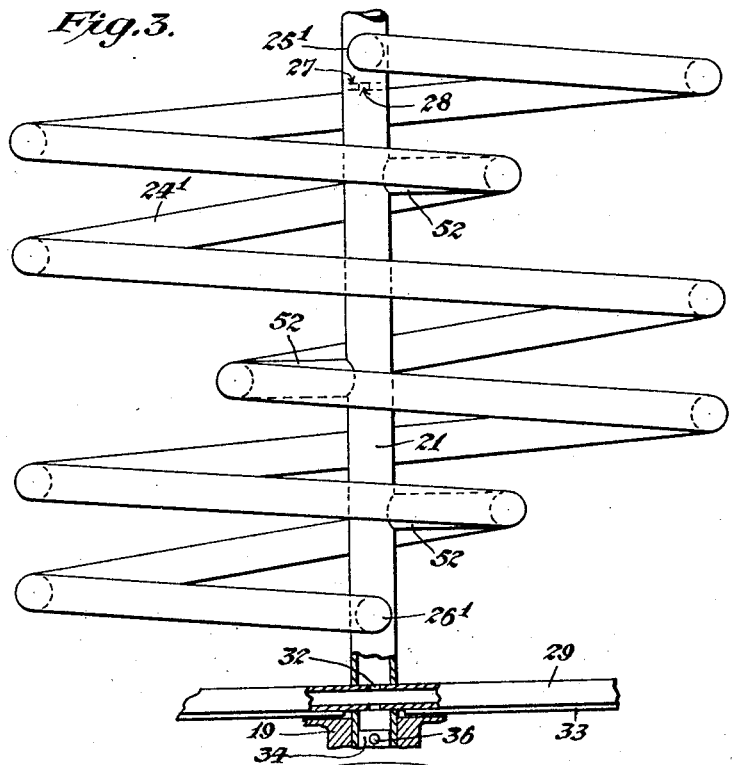
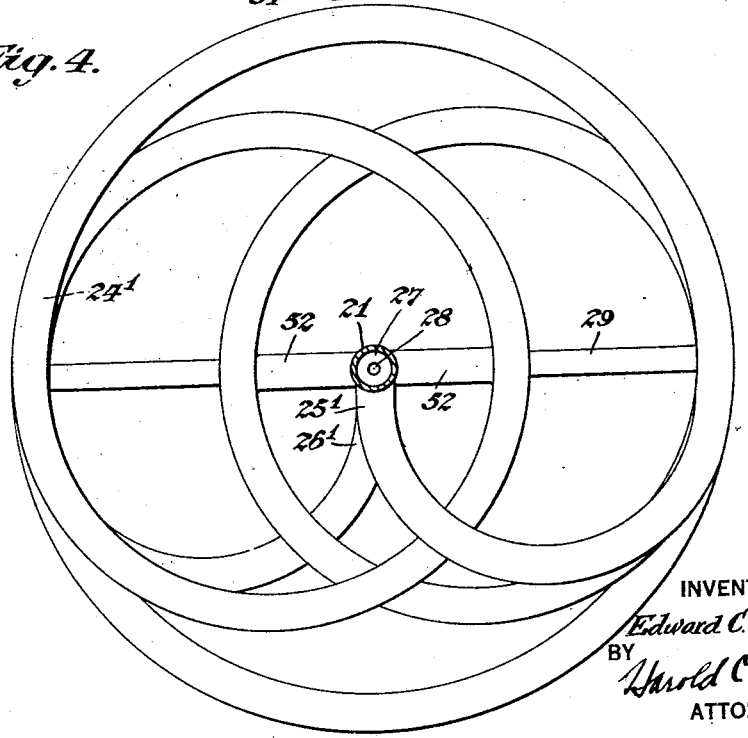
INVENTOR
Edward C. Calkins
BY
Harold C. Thorne
ATTORNEY Patented Feb. 21, 1928.

1,659,806

UNITED STATES PATENT OFFICE.

EDWARD C. CALKINS, OF BROOKLYN, NEW YORK.

STEAM COOKER.

Application filed July 1, 1925, Serial No. 40,827, and in Costa Rica May 25, 1925.

The present invention relates to apparatus for mixing or agitating and cooking of pulp material, and is primarily intended for pineapple and other fruit pulp and vegetables in canning and packing plants and in the field packing.

The cooker in accordance with this invention comprises a cylindrical pulp receptacle in which is arranged a rotating helically arranged steam coil which during its turning movement enters substantially all portions of the space in the receptacle in order to come into intimate contact with the pulp contained therein and insure the even cooking of the same. In the embodiments hereinafter specifically described, the steam coils consist of circular or helical coils arranged in the form of a screw worm adapted to lift the pulp and cause a continuous circulation thereof during the cooking operation. The steam supply is arranged to enter the top of the coils and pass downwardly therethrough by gravity and be emitted with the condensation through an exhaust extending through the bottom of the receptacle. The coils are all fluid tight and no steam is emitted into the product in the receptacle.

The primary object of the invention is to provide a heating and agitating coil for pulp and vegetable cookers which will thoroughly mix and uniformly cook the product for canning and packing purposes.

Further objects and details of the invention will appear as described in connection with the accompanying drawings and hereinafter set forth and claimed. Referring to the drawings forming a part of this specification, like characters of reference designate corresponding parts throughout the several views, in which,—

Figure 3 is an elevation view of another embodiment of the steam coils with parts in section and parts broken away; and Figure 4 is a plan view of the steam coils shown in Figure 3.

Figure 1:
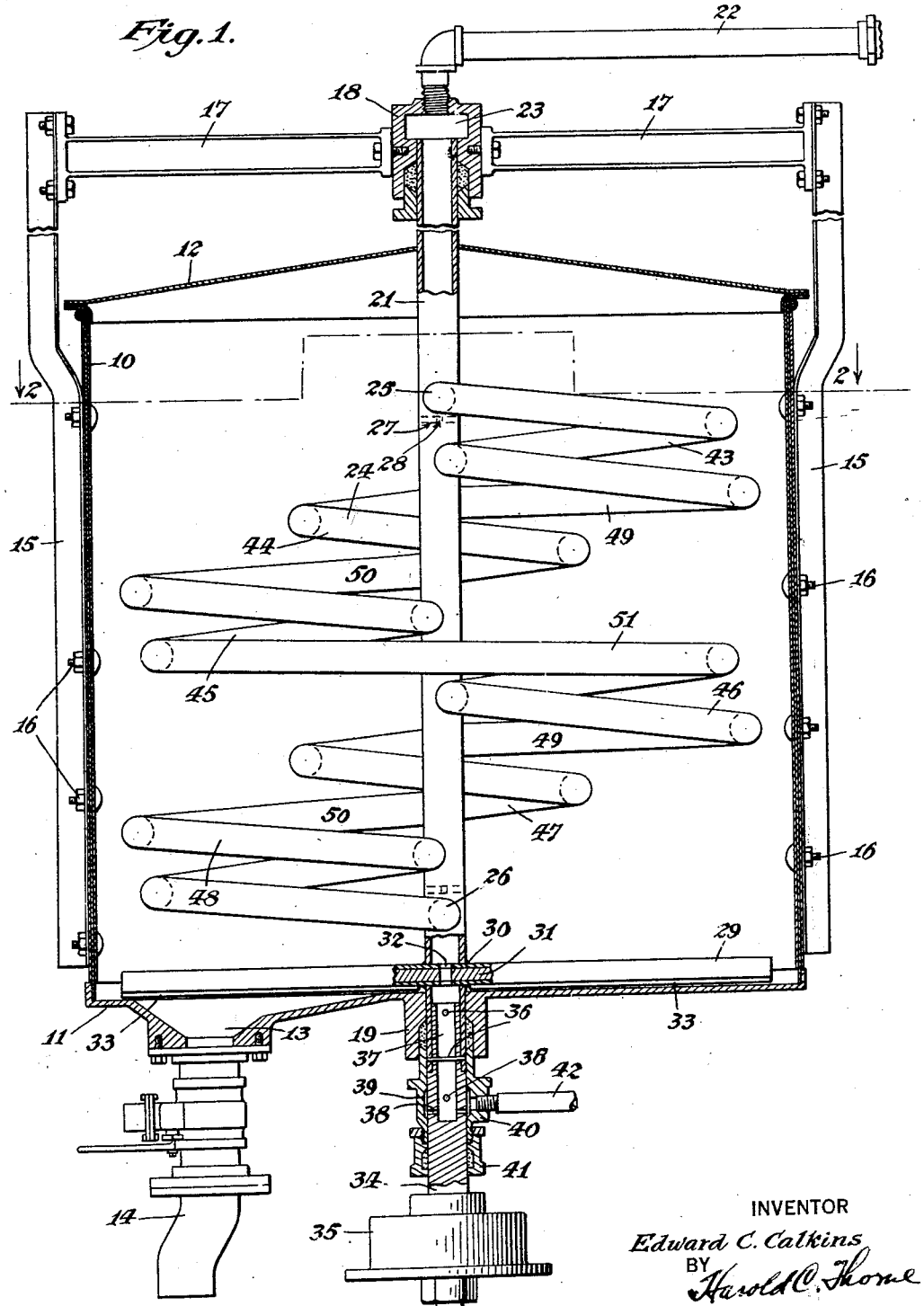
Figure 1 is a central vertical sectional view of a steam cooker in accordance with this invention with parts shown in elevation and parts broken away.
Figure 2:
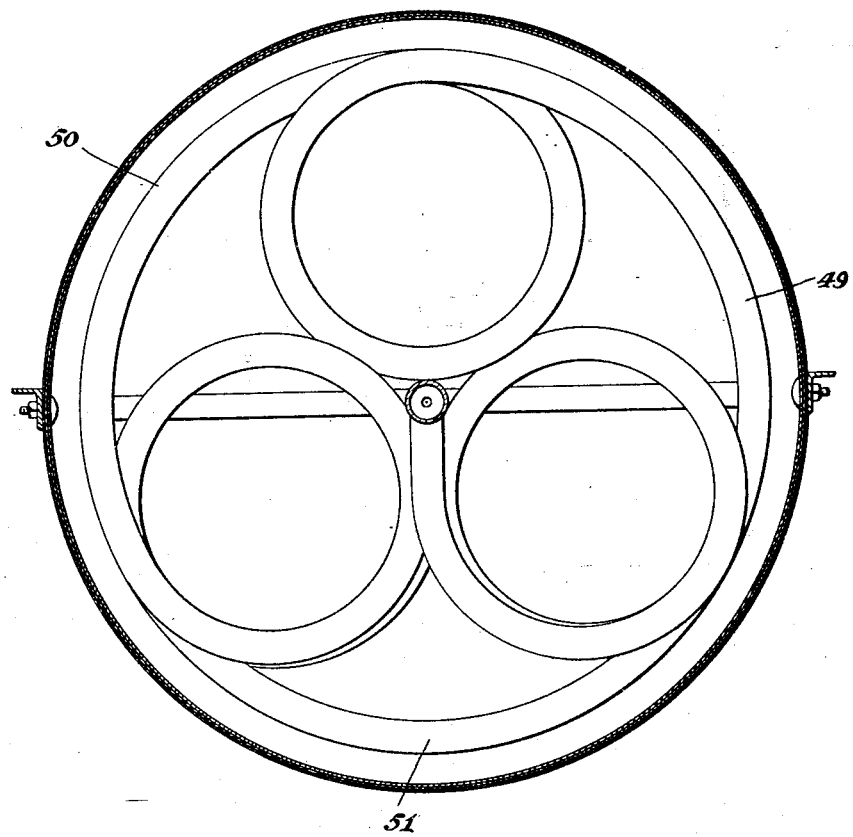
Figure 2 is a cross sectional view taken on line 2—2 of Figure 1, showing the rotary steam coils in plan.

Referring to the drawings, and particularly to Figures 1 and 2 in which an embodiment of the cooker which has proven highly efficient in operation, is disclosed, the cooker comprises a receptacle having cylindrical side walls 10 of sheet metal extending upward from a base 11. A movable cover 12 is provided for sealing the top of the receptacle, and the base is provided with an outlet 13 to which a valve and can filling spout 14 is secured.

Side frame members 15, preferably of angle iron bent to the form shown, are secured by means of brass stove bolts 16 to the sides of the receptacle and extend upwardly above the receptacle to a sufficient height to permit the cover to be raised for filling and examining the contents of the receptacle whenever desired. To the upper ends of the side frame members are secured cast iron T bars 17 between the inner ends of which is fastened a cast iron stuffing box 18.

The base 11 is provided with a central stuffing box 19 in line with the stuffing box 18 and journaled in these boxes is a heavy brass pipe 21 for conducting steam to and from the steam coils 24 within the receptacle. Steam is conducted through a steam supply pipe 22 to the stuffing box 18 discharging into a cavity 23 therein in direct communication with the upper open end of pipe 21. Thence the steam passes through the series of steam coils 24 starting at their upper end 25 and down and back into pipe 21 at the lower end 26 of the coils. Pipe 21 is provided with a plug or baffle 27 which obstructs the direct passage of steam therethrough and causes it to pass the steam coils 24, but this baffle has a small aperture 28 which permits the passage of condensate at this point and a small amount of live steam to prevent back pressure upward in the pipe from its lower end.

Below the lower end 26 of the steam coils 24 pipe 21 is apertured and receives a smaller cross pipe 29 which is integrally fastened in place as by brazing the joint as indicated at 30. This pipe may be plugged at 31 on each side of a central steam passage aperture 32 whereby steam will pass this pipe without passing into it. In the form shown in Figure 3 the cross pipe is left open and is heated by the steam which has passed through the steam coils. On the lower side of the cross pipe is fastened a brass scraper 33 which extends down adjacent to the base 11 for scraping the pulp or other material therefrom as the steam coils are rotated.

In the lower end of pipe 21 is fastened a steel shaft 34 and on which shaft is a driving pulley 35 or other suitable driving means for rotating the pipe 21 and steam coils 24. This shaft has a reduced upper end which extends into the pipe 21 and is secured therein by means of pins 36. The shaft is provided with a longitudinal central bore 37 and adjacent to the bottom of this bore are a plurality of lateral apertures 38; these afford an outlet for steam and condensate from the pipe 21 to a cavity 39 in an extension 40 of the stuffing box 19. Below this extension 40 is another stuffing box 41 and a pipe 42 connected with the extension 40 and in communication with the cavity 39 therein conducts the steam and condensate to a trap (not shown) or exhausts to the atmosphere if desired.

Referring to the steam coil construction, particularly Figures 1 and 2, the coils are preferably constructed of standard weight brass tubing, the upper end of which (25) communicates with the pipe 21 as heretofore set forth. This tubing is formed into a series of circular or helical coils, six being shown—43, 44, 45, 46, 47 and 48—of one turn each arranged in the form of a screw worm around the pipe 21. The coils are successively positioned at 120° apart around and tangent to the pipe 21, and at such points of tangency they may be secured to the pipe 21 for supporting them in place. Between the successive coils they are connected by integral sections of the tubing arranged in circular arcs 49, 50 and 51 which are in close proximity to the receptacle walls.

In operation the steam coils are rotated preferably in a counter clockwise direction which produces a lifting action on the pulp or other material in the receptacle. The material is lifted and thrown outward from the center and thus caused to circulate; and the scraper 33 prevents sticking to the bottom. Steam entering the upper end of the coil tends to heat the material to a greater extent as it rises and by the arrangement of the coils all portions thereof are brought into intimate contact with the heating surfaces of the coils, the material is thoroughly mixed and quickly brought to and maintained at a uniform temperature during the cooking process.

In the embodiment shown in Figures 3 and 4 the coil formation is somewhat modified. The coils 24′ comprises a length of tubing connected at its upper and lower ends 25′ and 26′ with the pipe 21 in the manner previously set forth. The coil formation however is modified and comprises large and small circular or helical coils alternately. The smaller of these coils are provided with horizontally extending supports 2 connecting them with the pipe 21 and it will be noted that each coil surrounds the pipe 21. It will be further noted that there is a greater proportion of the tubing in the proximity of the receptacle wall, thus distributing the heat outward to a greater extent.

The operation of this latter type of steam coils is substantially the same as in the form disclosed in Figure 1; however an additional path for circulation is afforded, downward along the pipe 21 in addition to that surrounding the coils and in view of the greater portion of the coils being adjacent to the receptacle walls a substantial portion of the material will be passed along this path.

In both forms of steam coils it is to be noted that the live steam enters the top of the coils from the pipe 21 and the steam and condensate pass downwardly by gravity to the outlet and condensate trap. Thus there is no possibility of the coils becoming filled and an even temperature is insured. By the screw worm arrangement of the coils an efficient propeller action of the coils is provided and the arrangement causes a thorough agitation and mixing of the pulp or other material during the cooking operation.

Having thus described embodiments of the steam cooker in accordance with this invention which are highly efficient and satisfactory in practice, it is not desired to have the invention limited to the exact construction specifically shown and described, it being understood that various changes may be made in form, proportion and arrangement of parts without departing from the spirit of the invention as indicated by the scope of the following claims.

What is claimed as the invention and is desired to be secured by Letters Patent is:—

1. In a steam cooker, including a vertically arranged cylindrical receptacle, a heating element therefor comprising a steam coil concentrically mounted therein and having portions thereof extending adjacent to the cylindrical walls of the receptacle in the form of semicircular arcs along the surface thereof but providing for a passage way therebetween and sections between and connecting said portions extending inwardly from said cylindrical walls, and means for supplying steam to the upper end of the steam coil, and means for conducting steam and condensate from the lower end thereof out of the receptacle.

2. A steam coil for cookers comprising circular or helical coils connected in series arranged in the form of a screw with each coil eccentric to the next adjacent coil in the series.

3. A heating element for cookers comprising a tubular member formed into circular or helical coils connected in series with each other by integral sections of the tube having a greater radius of curvature than said coils.

4. A heating element for cookers comprising a shaft providing steam inlet and outlet passages at its opposite ends, and a tubular coil member comprising a plurality of coils with adjacent coils arranged eccentric to each other and connected in series surrounding said shaft and having its ends communicating with said passages.

5. A heating element for cookers comprising a rotary supporting shaft, and a tubular member having a plurality of circular or helical coils with their axes arranged eccentric to the axis of the shaft and connected in series with each other, said tubular member being supported by said shaft.

6. A heating element for cookers comprising a rotary hollow shaft, and a steam coil having its ends connected so as to communicate therewith, said steam coil comprising a series of circular or helical turns of tubing connected by integral sections of the tubing, said helical portions having their axes eccentric to the axis of the shaft and parts of the said portions having points of tangency with the shaft.

In testimony whereof he affixes his signature.

EDWARD C. CALKINS.